(12) United States Patent
Eckstein et al.

(10) Patent No.: US 6,581,854 B2
(45) Date of Patent: Jun. 24, 2003

(54) IRRIGATION APPARATUS HAVING A LATERAL RECESSED PROJECTION

(75) Inventors: Eran Eckstein, San Diego, CA (US); Gershon Eckstein, San Diego, CA (US)

(73) Assignee: Drip Irrigation Systems, Ltd., San Diego, CA (US)

( * ) Notice: Subject to any disclaimer, the term of this patent is extended or adjusted under 35 U.S.C. 154(b) by 0 days.

(21) Appl. No.: 10/075,879

(22) Filed: Feb. 12, 2002

(65) Prior Publication Data

US 2002/0104903 A1 Aug. 8, 2002

Related U.S. Application Data

(63) Continuation of application No. 09/781,045, filed on Feb. 8, 2001, now abandoned.

(51) Int. Cl.⁷ ............................................... B05B 15/00
(52) U.S. Cl. ........................ 239/542; 239/1; 239/271; 239/533.1; 239/569; 239/547; 239/570
(58) Field of Search ............................. 239/533.1, 542, 239/547, 569, 570, 1, 271; 137/512.1, 512.4, 512.5, 512.15; 138/42, 43, 44, 45, 46

(56) References Cited

U.S. PATENT DOCUMENTS

| | | | |
|---|---|---|---|
| 3,799,442 A | 3/1974 | Delmar | |
| 3,863,845 A | 2/1975 | Bumpstead | |
| 4,036,435 A | 7/1977 | Pecaro | |
| 4,037,791 A | 7/1977 | Mullett et al. | |
| 4,100,940 A | 7/1978 | Spears | |
| 4,132,364 A | 1/1979 | Harmony | |
| 4,190,206 A | 2/1980 | Atkinson et al. | |
| 4,193,711 A | 3/1980 | Riusech | |
| 4,194,695 A | 3/1980 | Schopp | |
| 4,215,082 A | 7/1980 | Danel | |
| 4,369,923 A | 1/1983 | Bron | |
| 4,735,363 A | 4/1988 | Shfaram et al. | |
| 4,846,406 A | 7/1989 | Christy | |
| 5,111,996 A | 5/1992 | Eckstein | |
| 5,400,973 A | 3/1995 | Cohen | |
| 5,609,303 A | 3/1997 | Cohen | |
| 5,692,858 A | 12/1997 | Vaughan | |
| 5,820,029 A | 10/1998 | Marans | |
| 6,027,048 A | * 2/2000 | Mehoudar | 138/42 |
| 6,039,270 A | 3/2000 | Dermitzakis | |
| 6,095,185 A | 8/2000 | Rosenberg | |
| 6,186,423 B1 | 2/2001 | Chapman | |
| 6,213,408 B1 | * 4/2001 | Shekalim | 239/1 |
| 6,302,338 B1 | * 10/2001 | Cohen | 239/542 |

FOREIGN PATENT DOCUMENTS

EP    0 598 676 A    5/1994

OTHER PUBLICATIONS

Products Review: on Drippers; International Water & Irrigation; 1999; pp. 54–55; vol. 19, No. 2.
Tipaz Self–Compensating Pot Drippers Product Brochure; May 1995; Technical Plastics Works for Agriculture & Building Ltd.; pp. 1–4; Israel.
Special Products Section of Product Catalog; Sistema Azud, S.A.; 198; p. 23; Spain.

* cited by examiner

Primary Examiner—Robin O. Evans
(74) Attorney, Agent, or Firm—Edward B. Anderson

(57) ABSTRACT

An irrigation apparatus comprises an in-line dripper insert having a support for attaching a micro tube to the dripper outlet. A fluid conduit in which the insert is placed has an aperture in line with the support. The support preferably comprises a projection for securing a micro tube thereto, a sleeve for securing a micro tube or a connector thereto, or a shoulder for supporting the attachment of a connector to the fluid conduit at the aperture. The dripper insert is secured to the inner surface of the fluid conduit and is contained entirely therein. After detachment of the micro tubes, the main fluid line may be easily reeled or otherwise handled. The internal dripper provides structural internal support to the main fluid conduit when external pressure is applied to the line, such as when a micro tube or a connector is forced against the fluid line to be connected thereto.

11 Claims, 4 Drawing Sheets

IRRIGATION APPARATUS HAVING A LATERAL RECESSED PROJECTION

CROSS-REFERENCE TO RELATED APPLICATIONS

This application claims the benefit of and is a continuation of application Ser. No. 09/781,045, filed Feb. 8, 2001, now abandoned.

STATEMENT REGARDING FEDERALLY SPONSORED RESEARCH OR DEVELOPMENT

Not Applicable.

BACKGROUND OF THE INVENTION

The present invention relates generally to irrigation apparatus having lateral lines, and more particularly, to inserts adapted to be contained within a fluid conduit for supporting directly a lateral tube extending from the conduit.

The present application is preferably used in a drip irrigation system. An irrigation system applies water to specific plant or root zone locations in controlled quantities. It is thereby possible to irrigate planted areas with substantially less water than is used by general broadcast sprinkler or flooding methods. Several apparatuses for use in irrigation systems are well known.

One type of drip emitter, called a clipon dripper, is shown in U.S. Pat. No. 4,036,435, issued on Jul. 19, 1977, to Pecaro. The clipon dripper is generally large in size. Another type of a clipon dripper is the button dripper, which is typically smaller in size and is widely used in today's market. Both types of drippers include a connector attached externally to a main fluid conduit and a micro tube attachment facility. This apparatus has several disadvantages. The main fluid conduit cannot be easily reeled after attachment of the external dripper and the attachment of the external dripper is labor intensive which substantially increases the cost of the dripline. The button dripper, due to its size, has typically smaller fluid flow passageways and therefore is more sensitive to clogging. All external drippers have the disadvantage that the main fluid conduit may collapse or give way when external pressure is applied to attach the external dripper connector thereto. In addition, the external dripper connector may become dislodged when internal pressure is applied to the main fluid conduit.

A second type of drip apparatus, called merely a connector, is shown in U.S. Pat. No. 5,692,858, issued on Dec. 2, 1997, to Vaughan. This apparatus comprises a micro tube attached to a connector, wherein the connector is attached directly to a main fluid conduit at an aperture therein. This apparatus also has several disadvantages. The connector may easily become dislodged from the main fluid conduit, i.e., "pop off" the fluid line, when fluid in the conduit is pressurized. Leakage may occur between the connector and the main fluid conduit if the conduit is moved or distorted, which may occur under pressurized fluid conditions.

A third type of drip apparatus comprises an external connector secured to the main fluid conduit by an external clip or band. The connector and the clip or band may be manufactured as a single unit. This apparatus has several disadvantages. The apparatus may be expensive to install due to the expense of purchasing the clips and the connectors, and due to the labor costs of attaching each of the connectors and clips to the main fluid conduit. Moreover, the clip or band does not always hold the connector in watertight engagement with the main fluid conduit so that leaks may occur.

There thus remains a need for an emitter apparatus that is easy to install, that is relatively inexpensive to purchase and manufacture, and that allows a main fluid conduit to be reeled and re-reeled after use. Moreover, there remains a need for an emitter apparatus that provides support to the main fluid conduit when connectors and/or micro tubes are secured thereto.

BRIEF SUMMARY OF THE INVENTION

These features are provided in the present invention by an irrigation apparatus comprising an insert, such as an in-line drip emitter, adapted to be secured within a main fluid conduit for supporting a lateral tube element, such as a micro tube or connector.

In general, the invention provides an irrigation apparatus comprising an insert that is adapted to be received within a fluid conduit and having an outer surface mountable in physical contact with an inner surface of the fluid conduit. The insert includes a support adapted for supporting a lateral, tube element extending through an aperture in the fluid conduit when the support is positioned adjacent to the aperture. The insert also includes a fluid passageway providing fluid communication between the interior of the fluid conduit and the aperture.

The insert in the preferred embodiment of the invention is an in-line drip emitter or dripper. It also may simply be a support element providing a relatively unrestricted water passageway between the interior of the fluid conduit and the aperture. The flow-limiting fluid passageway characteristic of drip emitters is not required for the invention. Further, the present invention can be applied to a variety of in-line drippers. For example, the internal micro tubing connector of the present invention can be implemented with a conventional non-compensated dripper or with a pressure compensated dripper. The dripper may have different features, such as a retention (non-leakage) valve, pressure regulating features or other such valve means. The physical configuration of the insert may also vary. For example, the insert may be cylindrical or flat in shape. It can be symmetrical, i.e., the output support may be positioned centrally along the insert, or the insert may be asymmetrical, with the outlet positioned closer to one end of the insert.

The invention also provides a method of assembling an irrigation apparatus. Generally, this method includes the steps of (1) providing an irrigation fluid conduit including an inner surface; (2) securing an insert to the inner surface of the fluid conduit; (3) forming an aperture in the fluid conduit adjacent to the insert; (4) extending an end of a tube element through the aperture; and (5) supporting the end of the tube element extending through the aperture relative to the insert.

The preferred embodiment of the invention is thus seen particularly to provide an improved method and apparatus for connecting a micro tube or connector to a drip irrigation line at the dripper location. The method and apparatus take advantage of the in-line dripper with all its advantages over the complicated, external button and strap/band drippers, and over the delicate prior art connector apparatus. Some embodiments of the present invention do not require additional connectors and adapters and reduces labor costs because once the fluid conduit is unreeled the only remaining task is to attach a micro tube to the output opening of the dripper. Moreover, the internal emitter provides structural support for the main fluid conduit when external pressure is applied to the conduit during attachment of a micro tube or a connector thereto.

In a preferred embodiment the internal emitter comprises a cylindrical dripper having a flow-restricting fluid passageway formed between the dripper and the inner surface of the fluid conduit. The fluid passageway or labyrinth communicates between the interior of the fluid conduit and a tube-element support in a connection region on the dripper. The support is aligned with an aperture in the fluid conduit and facilitates connection of a lateral tube element relative to the internal dripper. The lateral tube element may be any device associated with a micro tube, such as an end of the tube or a connector to which a micro tube may be attached. The support preferably comprises a projection for securing a micro tube thereto. The internal dripper typically is secured to the inner surface of the main fluid conduit and is contained entirely therein such that there are no projections outside the conduit. This is the preferred embodiment since, after detachment of the micro tubes, the main fluid line is free of external parts that could interfere with the reeling or other handling of the conduit. The internal dripper provides structural internal support to the fluid conduit when external pressure is applied to the line, such as when a micro tube or a connector is forced against the main fluid line to be connected thereto. The invention may also be practiced with embodiments that have a protrusion through the conduit aperture.

DETAILED DESCRIPTION OF THE PREFERRED EMBODIMENTS OF THE INVENTION

Figure 1:
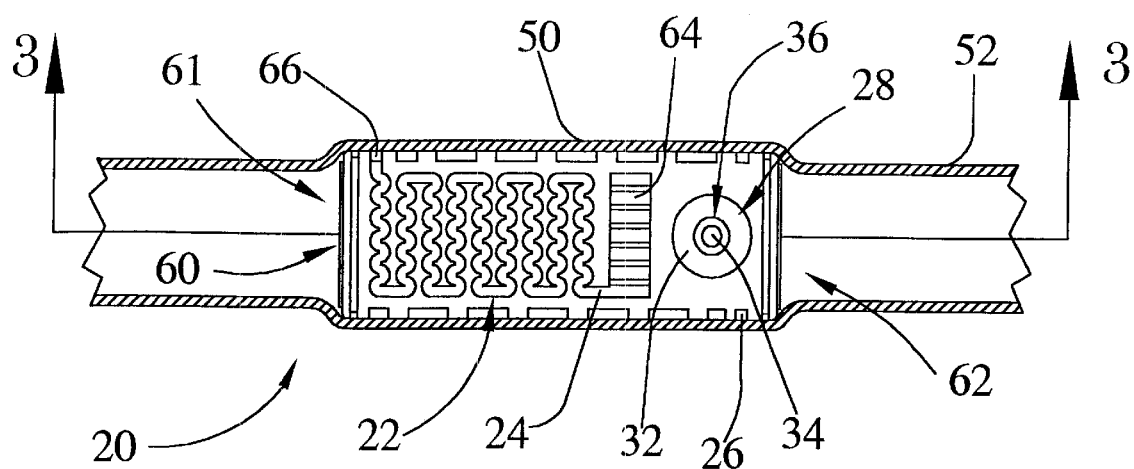
FIG. 1 is a partial cut-away top view of an internal emitter made according to the present invention.

Referring now to the figures, FIG. 1 is a partial cut-away top view of an irrigation apparatus 20 made according to the present invention. Apparatus 20 is formed by an outer member or sleeve 50 of a main fluid conduit 52 and a tubular insert 60. The insert is also called an internal emitter, internal dripper, irrigation apparatus, or a dripper body. Sleeve 50 includes an opening 30 (shown in FIG. 3) through which a micro tube can be connected. The opening, or aperture, extends through the conduit from the hollow interior to an exterior surface thereof. As will be described in more detail below, sleeve 50 and insert 60 define a fluid passageway 22 that terminates at opening 30. In another embodiment, insert 60 may singularly define a fluid passageway 22 that terminates at opening 30, thereby forming a standalone emitter apparatus 20.

Main fluid conduit 52 and insert 60 typically are manufactured of high density, durable plastic sodas to withstand high fluid pressures and harsh environmental conditions. The conduit and the internal emitter may be manufactured in any size or material as is desirable for particular applications. Preferably, insert 60 is inserted as the conduit is extruded using well-known drip irrigation line manufacturing methods. During this process, the insert is integrally bonded to the conduit.

Insert 60 has an inner surface 61 (more clearly shown in FIG. 3) that defines, at least in part, an inner chamber 62 that preferably provides an uninterrupted fluid flow through an internal fluid passageway of conduit 52. A series of inlet openings shown generally at 64 provide communication between the inner surface of chamber 62 and an inlet end 24 of fluid passageway or labyrinth 22. Labyrinth 22 defines a fluid flow path extending between insert 60 and sleeve 50, in a direction generally to the left in FIG. 1, so as to provide fluid flow at a channel 34, formed in a support 28, for support and connection of a micro tube, such as micro tube 70 shown in FIG. 3A. Labyrinth 22 may include pressure regulating means, as described in U.S. Pat. No. 5,111,996, issued on May 12, 1992 to Eckstein, and U.S. Pat. No. 5,615,838, issued Apr. 1, 1997 to Eckstein et al., wherein the disclosures of said patents are incorporated by reference herein.

It will be appreciated that opening 30 in conduit 52 is aligned with support 28 of insert 60. Accordingly, during manufacture of the conduit, it is preferable to insert all of the inserts in the same orientation and direction. This will standardize the position of the support, and thereby the opening, on the same side of the conduit and at regular intervals along the conduit.

Figure 2:
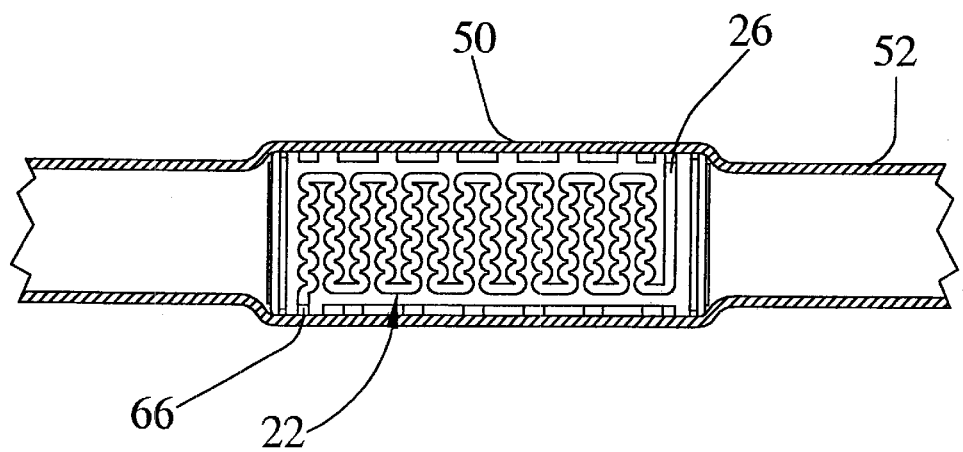
FIG. 2 is a partial cut-away bottom view of the internal emitter of FIG. 1.

FIG. 2 is a partial cut-away bottom view of the internal emitter insert 60 of FIG. 1. In this bottom view labyrinth 22 is shown extending from the topside of the insert via intermediate channel 66. Fluid flow through the labyrinth continues toward the right in FIG. 2 to outlet end 26. From outlet end 26 fluid flows through channel 27 (shown in FIG. 3) and then through channel 34 (FIG. 1). Accordingly, a portion of the flow through conduit 52 flows into labyrinth 22 and then into micro tube 70, and the remainder of the fluid continues to flow through conduit 52.

Figure 3:
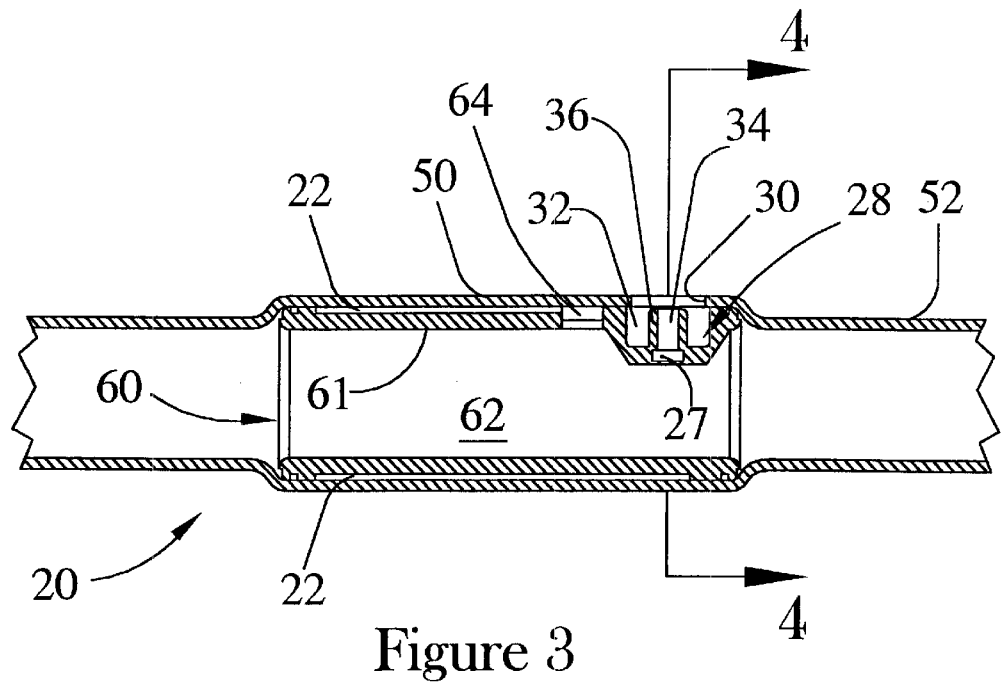
FIG. 3 is a side cross-sectional view taken along line 3—3 of FIG. 1.

FIG. 3 is a side cross-sectional view taken along line 3—3 of FIG. 1. Support 28 includes a recess 32 and a stem 36, positioned within the recess 32.

Figure 3A:
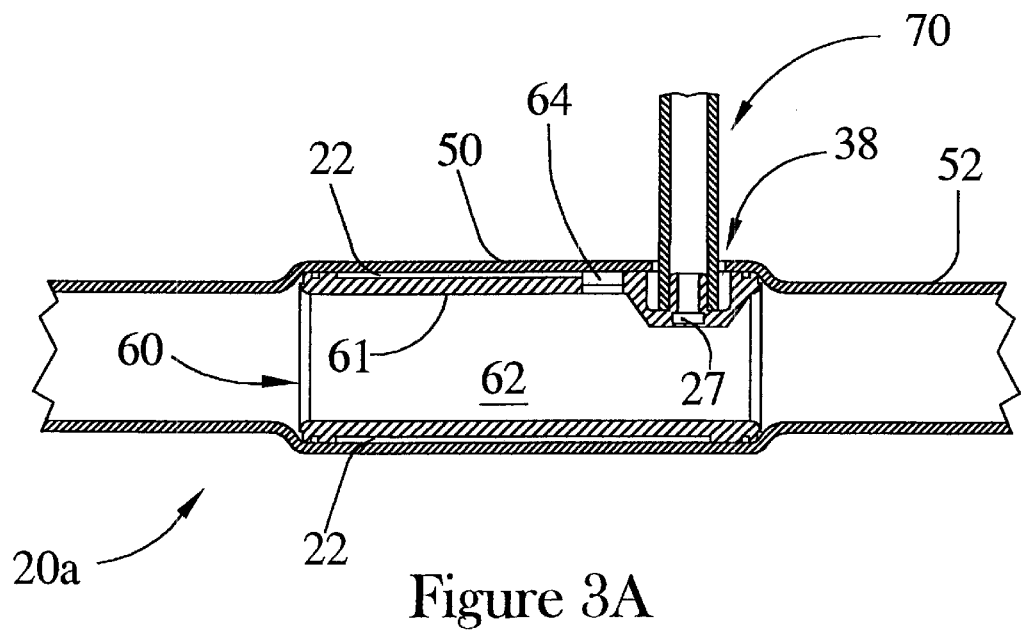
FIG. 3A is a view similar to that shown in FIG. 3 but additionally showing a micro tube connected to the internal emitter.

FIG. 3A is a view similar to that shown in FIG. 3 but additionally shows the end of micro tube 70, also called a drip tube, connected to the internal emitter and forming, in combination, an irrigation apparatus 20a. In particular, micro tube 70 is frictionally secured to stem 36 by placement of an end of the micro tube, also referred to as a tube element, through opening 30 in conduit 52 and into the recess 32, also called a cavity, surrounding stem 36, also called a projection. Due to the watertight seal between sleeve 50 and insert 60 around a perimeter of opening 30, tube 70 need only be secured to stem 36 to provide a water tight seal between insert 60 and tube 70. In other words, opening 30 may have a diameter greater than an outer diameter of tube 70 so that there is a slight gap 38 between the outer surface of the micro tube and the inner edge of opening 30. This slight gap provides for ease of placement of tube 70 into recess 32 and positioning of the tube about stem 36. Moreover, gap 38 allows for bending and flexing of the tube relative to conduit 52. Stem 36 may, but preferably does not extend outwardly from conduit 52 so that the conduit, when the micro tubes are disconnected, may be reeled and unreeled without difficulty. Recess 32 and/or stem 36 preferably are aligned with and positioned inwardly of aperture 30 in the conduit.

Figure 4:
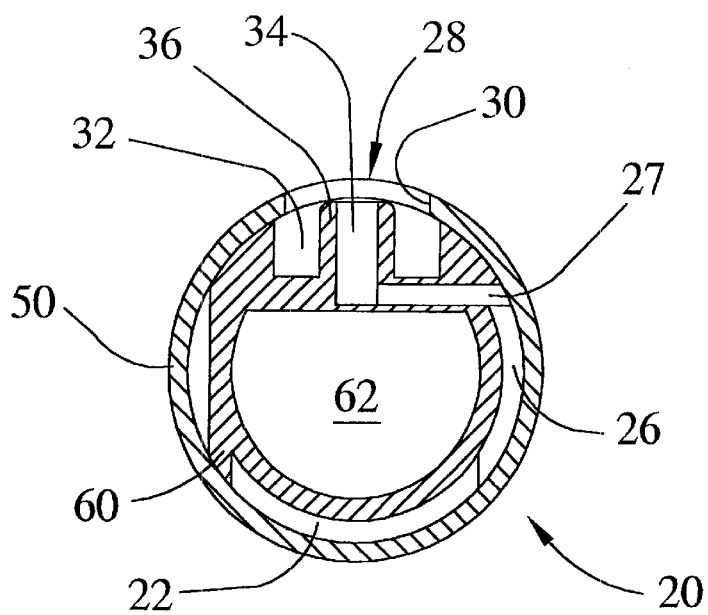
FIG. 4 is an end cross-sectional view taken along line 4—4 of FIG. 3.

FIG. 4 is a cross-sectional view taken along line 4—4 of FIG. 3. Labyrinth 22 is shown in communication with outlet end 26, which end is in communication with channel 27. Channel 27 in turn is in communication with channel 34. Opening 30 is shown having a diameter slightly smaller than a diameter of recess 32 but larger than an outer diameter of a tube or connector adapted to be secured to stem 36, as shown in FIG. 3A.

Figure 5:
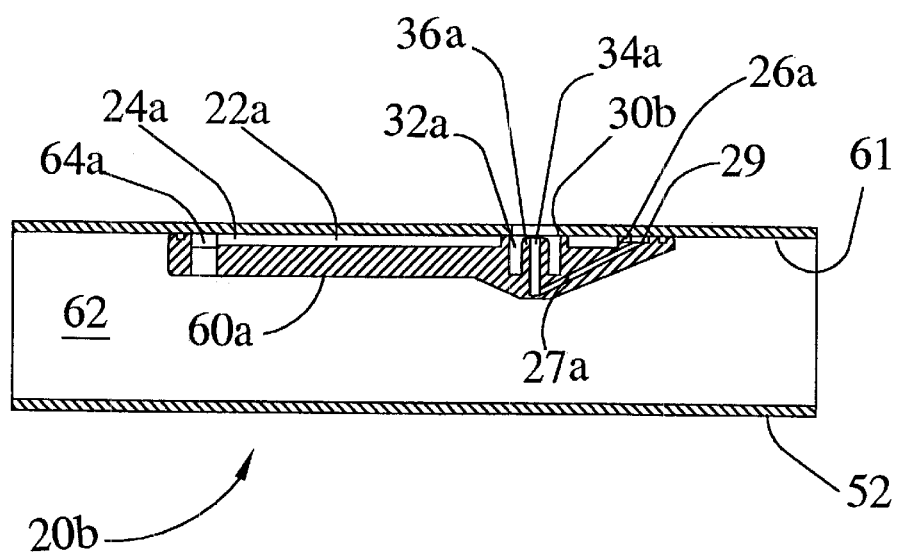
FIG. 5 is a side cross-sectional view of a relatively flat internal emitter taken along line 5—5 of FIG. 6.

FIG. 5 is a side cross-sectional view of a relatively flat internal emitter 60a that is bonded to the inner surface 61 of sleeve 50 to form an irrigation apparatus 20b. As with the previous embodiment, apparatus 20b is formed by inserting emitter 60a while conduit 52 is being extruded.

The internal emitter includes a series of inlet openings shown generally at 64a that provide communication between chamber 62 and inlet end 24a of labyrinth 22a. The labyrinth extends from inlet 24a to outlet 26a, at the right end of internal emitter 60a. From outlet end 26a of the labyrinth, fluid flows to intermediate reservoir 29, and then through channel 27a that is connected to channel 34a as shown. Channel 34a extends upwardly through stem 36a positioned within recess 32a. Recess 32a is aligned with opening 30b in conduit 52 for placement of a micro tube as described with reference to the embodiment previously described. As mentioned above, stem 36a typically does not extend outwardly into or through opening 30b, i.e., the support 28a is positioned inwardly of aperture 30b. The stem is adapted to frictionally receive a micro tube thereon.

Figure 6:
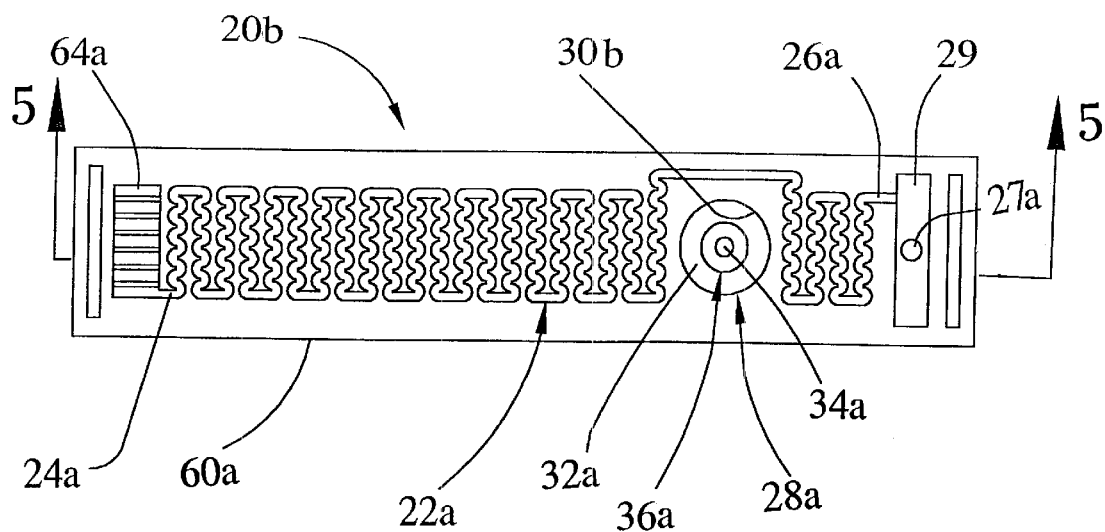
FIG. 6 is a top view of the internal emitter of FIG. 5.

FIG. 6 is a top view of the internal emitter of FIG. 5 showing labyrinth 22a extending from left to right in the figure, and around recess 32a.

Figure 7:
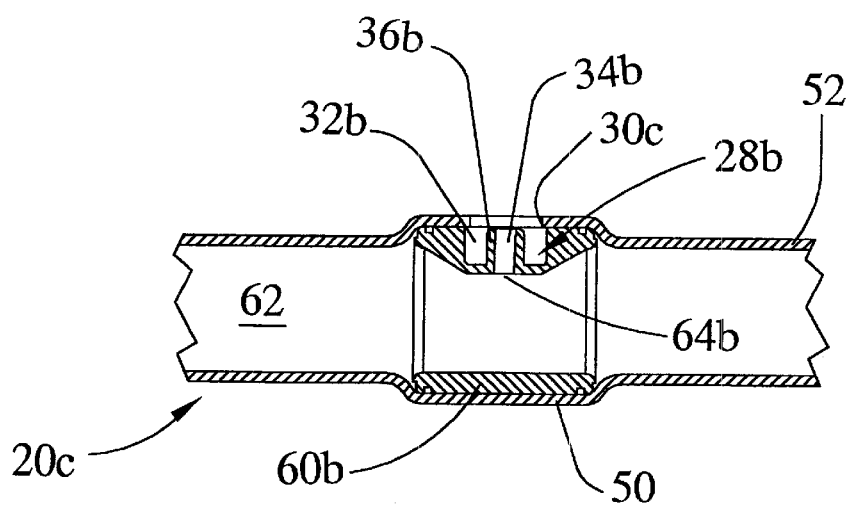
FIG. 7 is a side cross-sectional view of an internal support element insert made according to the present invention.

FIG. 7 is a side sectional view of an internal support element insert 60b that is bonded to the inner surface of sleeve 50 to form an irrigation apparatus 20c.

The internal support element includes an inlet opening shown generally at 64b that provides communication between chamber 62 and channel 34b. Channel 34b extends upwardly through stem 36b positioned within recess 32b. Recess 32b is aligned with opening 30c in conduit 52 for placement of a micro tube. Stem 36b is adapted to frictionally receive a micro tube thereon.

The figures discussed above typically show only a portion of a fluid line, i.e., a single sleeve portion and a single insert. However, those skilled in the art will understand that multiple inserts may be placed within a continuous line of fluid conduit. It will also be understood that although the inserts described above form drip emitters, inserts may be used that do not form drip emitters. Further, an insert may have a plurality of supports for attaching a plurality of lateral tubes. Additionally, the internal dripper preferably is contained entirely within the conduit such that there are no projections outside the conduit. The invention may also be practiced with embodiments that have a protrusion through the conduit aperture.

In the above description numerous details have been set forth in order to provide a more through understanding of the present invention. It will be obvious, however, to one skilled in the art that the present invention may be practiced using other equivalent designs.

We claim:

1. An irrigation apparatus comprising an insert adapted to be received within a fluid conduit and having an inner surface, an outer surface, and a fluid passageway extending between the inner surface and the outer surface, the outer surface being adapted to be mounted in physical contact with an inner surface of the fluid conduit, the outer surface of the insert defining a recess opening outwardly, the insert including a projection extending outwardly in the recess, the projection being adapted to be inserted into the end of a lateral tube element extending through an aperture in the fluid conduit for supporting the lateral tube element, and the fluid passageway extending between the inner surface of the insert and the projection for providing fluid communication between the interior of the fluid conduit and a lateral tube element when the insert is received within the fluid conduit and the lateral tube element is supported on the projection.

2. The irrigation apparatus of claim 1 wherein the insert is an in-line drip emitter and the fluid passageway is fluid-flow restricting and has an outlet opening in the projection.

3. The irrigation apparatus of claim 1 further comprising the fluid conduit and the lateral tube element extending through the aperture wherein the lateral tube element is smaller than the aperture.

4. The irrigation apparatus of claim 1 further comprising the lateral tube element supported by the projection and the fluid passageway extends into the lateral tube element.

5. The irrigation apparatus of claim 1 further comprising the fluid conduit and wherein the insert is bonded to the inner surface of the fluid conduit.

6. A method of assembling an irrigation apparatus comprising the steps of:

providing an irrigation fluid conduit including an inner surface and an insert having an outer surface defining a recess opening outwardly, and including a projection extending outwardly in the recess;

securing an insert to the inner surface of the fluid conduit;

forming an aperture in the fluid conduit adjacent to the insert in alignment with the projection;

extending an end of a lateral tube element through the aperture; and supporting the end of the lateral tube element extending through the aperture relative to the insert by inserting the projection into the end of the lateral tube element.

7. The method of claim 6 wherein the step of attaching comprises frictionally engaging an inner surface of the lateral tube element to the projection.

8. An irrigation apparatus comprising an insert adapted to be received within a fluid conduit and having and inner surface, an outer surface, and a fluid passageway extending between the inner surface and the outer surface, the outer surface being adapted to be mounted in physical contact with an inner surface of the fluid conduit, the outer surface of the insert defining a recess opening outwardly, the insert including a projection extending outwardly in the recess, and the fluid passageway extending between the inner surface of the insert and the recess for providing fluid communication between the interior of the fluid conduit and the exterior of the fluid conduit via the projection when the projection is aligned with an aperture in the fluid conduit.

9. The irrigation apparatus of claim 8 wherein the insert is an in-line drip emitter and the fluid passageway is fluid-flow restricting.

10. The irrigation apparatus of claim 8 further comprising the fluid conduit and wherein the insert is bonded to the inner surface of the fluid conduit.

11. The irrigation apparatus according to claim 8 wherein the projection defines a channel and the fluid passageway is in communication with the channel in the projection.

* * * * *